United States Patent
Kouda

(10) Patent No.: US 7,866,628 B2
(45) Date of Patent: Jan. 11, 2011

(54) PIPE COUPLING

(75) Inventor: Toru Kouda, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 257 days.

(21) Appl. No.: 12/227,408

(22) PCT Filed: May 17, 2007

(86) PCT No.: PCT/JP2007/060102
§ 371 (c)(1), (2), (4) Date: Nov. 17, 2008

(87) PCT Pub. No.: WO2007/135939
PCT Pub. Date: Nov. 29, 2007

(65) Prior Publication Data
US 2009/0205726 A1 Aug. 20, 2009

(30) Foreign Application Priority Data
May 19, 2006 (JP) .............................. 2006-140910

(51) Int. Cl.
*F16L 37/28* (2006.01)
(52) U.S. Cl. .............................. 251/149.2; 137/614.03; 137/614.05
(58) Field of Classification Search ................. 137/614.02–614.05; 251/149.2, 149.6
See application file for complete search history.

(56) References Cited

U.S. PATENT DOCUMENTS

| | | | | |
|---|---|---|---|---|
| 3,279,497 A | * | 10/1966 | Supinger et al. | 137/614.03 |
| 4,473,211 A | * | 9/1984 | Fremy | 251/149.2 |
| 4,627,598 A | | 12/1986 | Fremy | |
| 5,090,448 A | * | 2/1992 | Truchet | 137/614.03 |
| 6,089,539 A | | 7/2000 | Kouda | |
| 7,028,982 B2 | | 4/2006 | Kohda | |

(Continued)

FOREIGN PATENT DOCUMENTS

JP 62-180193 8/1987

(Continued)

*Primary Examiner*—Kevin L Lee
(74) *Attorney, Agent, or Firm*—Wenderoth, Lind & Ponack, L.L.P.

(57) ABSTRACT

A pipe coupling member has a tubular body (20) and a valve unit (22) slidably set in the through-hole of the tubular body. The valve unit has a valve holder (26) and a rotary valve member (30) supported by the valve holder so as to be rotatable about a pivot axis perpendicular to the axis of the through-hole. The valve holder comprises a valve seat portion (26-1) and a valve support portion (26-2) that are separately disposed in series in the axial direction or the direction of the axis of the though hole. The valve support portion rotatably supports the rotary valve member. When the valve holder moves axially in the through-hole, the rotary valve member is rotated by a cam mechanism (32) and displaced between a closed rotational position and an open rotational position while its spherical outer peripheral surface sliding relative to an annular valve seat of the valve seat portion. When in the closed rotational position, the rotary valve member sealingly engages all around the annular valve seat to close the fluid path. A spring member (28) urges the valve support portion to urge the valve holder toward the closed rotational position. When the coupling member is decoupled, the rotary valve member therein is surely placed in the closed rotational position.

7 Claims, 6 Drawing Sheets

U.S. PATENT DOCUMENTS 7,131,458 B2 11/2006 Kohda

FOREIGN PATENT DOCUMENTS

| JP | 2-154889 | 6/1990 |
| JP | 11-108279 | 4/1999 |
| JP | 2005-127375 | 5/2005 |
| JP | 2005-127376 | 5/2005 |
| TW | 200307799 | 12/2003 |

* cited by examiner

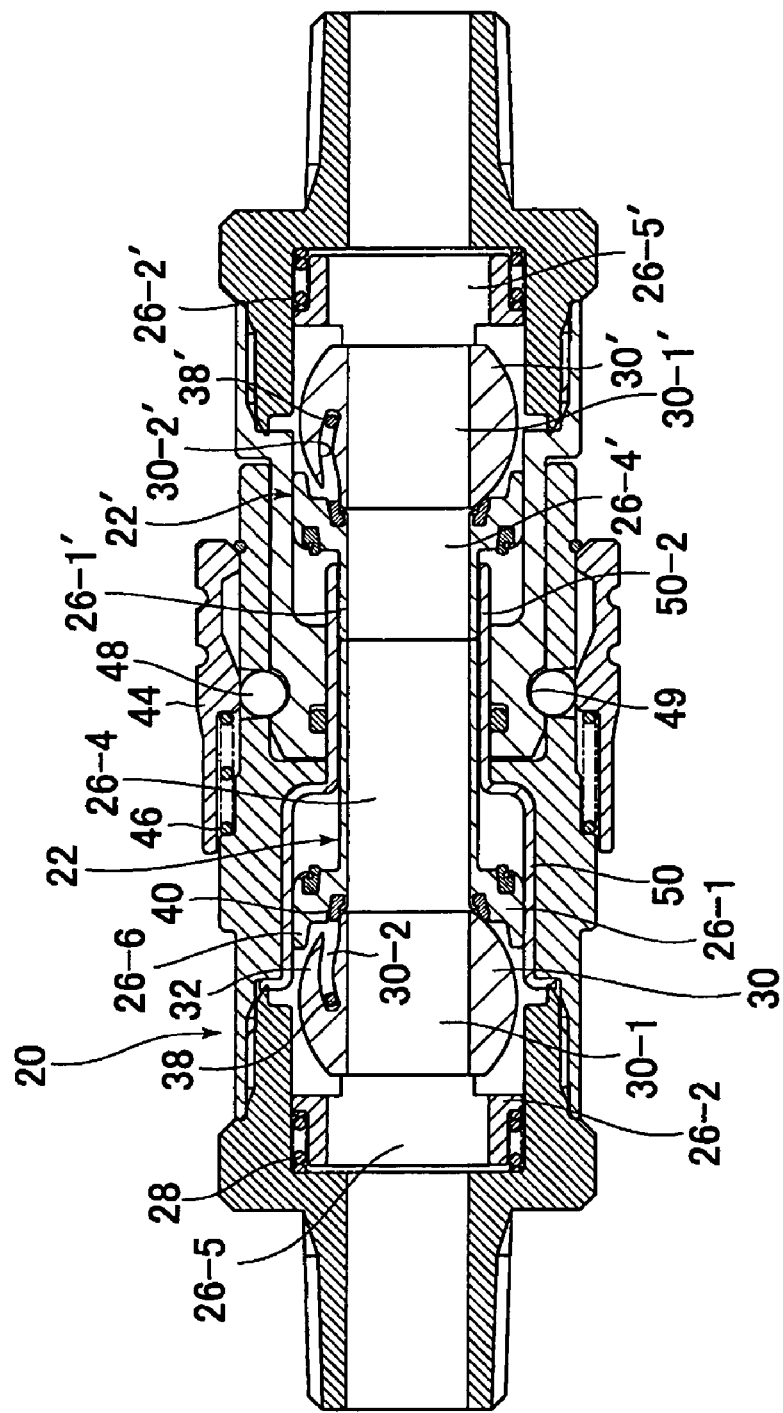

PIPE COUPLING

TECHNICAL FIELD

The present invention relates to pipe couplings.

BACKGROUND ART

Among pipe couplings comprising female and male coupling members, there has been developed a pipe coupling wherein one of the two coupling members has a valve unit axially slidably set in a through-hole thereof, and the valve unit is moved backward and forward in response to coupling and decoupling between the two coupling members to open and close a fluid path in the coupling member (see Japanese Patent Application Publication No. 2005-127376).

Specifically, the valve unit is urged axially forward by a spring member toward a closed position for closing the fluid path. When the two coupling members are coupled to each other, one coupling member pushes the valve unit of the other coupling member thereinto against the urging force of the spring member to an open position for opening the fluid path. When the two coupling members are decoupled from each other, the valve unit is returned to the closed position by the urging force of the spring member. The valve unit has a fluid path extending in the axial direction of the through-hole of the coupling member. In response to the valve unit being moved axially backward and forward, a rotary valve member provided in the valve unit is rotated by a cam mechanism to open and close the fluid path.

The rotary valve member has a spherical seal surface on a part of the outer peripheral surface thereof. When the two coupling member are not coupled to each other, the seal surface sealingly engages all around a valve seat formed to surround the fluid path, thereby closing the fluid path. When the coupling members are coupled together and consequently the valve unit is moved backward, the rotary valve member is rotated, causing the seal surface to be displaced relative to the valve seat while sliding against it. As a result, the sealing engagement of the seal surface all around the valve seat is free to open the fluid path.

DISCLOSURE OF THE INVENTION

Problem to be Solved by the Invention

The above-described pipe coupling needs to press the seal surface of the rotary valve member against the valve seat with an increased force in order to surely seal the fluid path with the seal surface. This will, however, result in an increase in frictional force occurring between the seal surface and the valve seat, and the frictional force may undesirably stop the rotation of the rotary valve member when returning to the fluid path closing position in response to the valve unit being moved from the open position to the closed position by the spring member.

It is necessary in order to prevent the above-described problem to increase the urging force of the spring member to return the valve unit to the closed position. In this regard, however, there is a limit to increasing the urging force of the spring member because the valve unit needs to be moved backward against the spring member when the two coupling members are coupled to each other.

The present invention has been made in view of the above-described circumstances. Accordingly, an object of the present invention is to provide a pipe coupling arranged so that even if the pressing force applied between the rotary valve member and the valve seat is sufficiently increased, the rotation of the rotary valve member will not be stopped in the course of returning to the position for closing the fluid path.

Means for Solving the Problem

That is, the present invention provides a pipe coupling comprising female and male coupling members that are coupled to each other. At least one of the coupling members includes a tubular body having a through-hole extending from a forward end opening thereof through which the other of the coupling members is inserted. The coupling member further includes a valve unit set in the through-hole so as to be slidable in a direction of an axis of the through-hole. The valve unit has a valve holder that has a fluid path extending therethrough in the axial direction and that is movable in the through-hole between an open position and a closed position closer to the forward end opening than the open position. The valve unit further has a rotary valve member supported by the valve holder so as to be rotatable about a pivot axis perpendicular to the axis of the through-hole. The rotary valve member is rotatable between an open rotational position where the rotary valve member allows a fluid to flow through the fluid path when the valve holder is in the open position, and a closed rotational position where the rotary valve member blocks the fluid from flowing through the fluid path when the valve holder is in the closed position. The coupling member further includes a cam mechanism set between the valve unit and the tubular body to cause the rotary valve member to rotate between the closed rotational position and the open rotational position when the valve holder moves between the closed position and the open position. Further, the coupling member includes urging means that urges the valve holder from the open position toward the closed position. The valve holder has a tubular valve seat portion and a tubular valve support portion that are disposed in series in the axis of the through-hole so as to be displaceable relative to each other in the direction of the axis. The valve support portion supports the rotary valve member rotatably about the pivot axis. The valve seat portion has an annular valve seat formed around the fluid path. The rotary valve member has a seal surface on a part of the outer peripheral surface thereof. The seal surface slides relative to the valve seat when the rotary valve member is rotated between the closed rotational position and the open rotational position such that when the rotary valve member is in the closed rotational position, the seal surface sealingly engages all around the valve seat to close the fluid path, whereas when the rotary valve member is in the open rotational position, the sealing engagement of the seal surface all around the valve seat is free to open the fluid path. The urging means applies an urging force to the valve support portion to urge the valve holder from the open position toward the closed position. The valve holder is displaced from the closed position toward the open position against the urging means when the valve seat portion is engaged by the other of the coupling members inserted into the through-hole from the forward end opening.

In this pipe coupling, when the coupled coupling members are to be decoupled from each other, as the other coupling member is separated from the one coupling member, the valve unit, which has so far been pushed in by the other coupling member, is moved forward toward the closed position by the urging means (spring member). If the rotation of the rotary valve member is stopped by frictional force occurring between the rotary valve member and the valve seat in the course of the valve unit being moved toward the closed position, the cam mechanism, which urges rotation of the rotary valve member on the basis of the axial movement of the valve support portion of the valve holder, i.e. the axial movement of the rotary valve member rotatably supported by the valve support portion, acts reversely on the valve support portion to stop the movement of the valve support portion. At this time, if the other coupling member continues to be separated from the one coupling member, there is no longer the pressing force from the urging means that has so far been applied to the valve seat of the valve seat portion through the rotary valve member between the other coupling member and the rotary valve member. Accordingly, the frictional force between the rotary valve member and the valve seat reduces. Consequently, the rotary valve member becomes free to rotate, and the valve support portion is moved forward so as to follow the valve seat portion by the urging force of the urging means. Thus, the rotary valve member is rotated toward the closed rotational position by the cam mechanism. Accordingly, even if the pressing force applied between the rotary valve member and the valve seat is sufficiently increased to ensure sealing therebetween, the rotary valve member can surely return to the closed rotational position when the coupled coupling members are decoupled from each other.

Specifically, the pipe coupling may be arranged as follows. The valve support portion has a pair of support arms extending forward from a tubular portion thereof with two opposite side surfaces of the rotary valve member being in contact with the support arms, the support arms abutting against the rear end surface of the valve seat portion, and the rotary valve member is rotatably supported between the support arms.

More specifically, the pipe coupling may be arranged as follows. The valve seat portion has on the rear end surface thereon a tubular extending portion extending rearward from the outer peripheral edge of the rear end surface. The extending portion has a tapered inner peripheral surface sloping radially outward in the rearward direction. The support arms have respective distal end portions inserted into the tubular extending portion. The distal end portions of the support arms are provided with respective tapered surfaces corresponding to the tapered inner peripheral surface of the tubular extending portion. The mutually opposing tapered surfaces allow the valve seat portion and the valve support portion to be kept in axial alignment with each other when the valve seat and valve support portions are axially separated relative to each other and returned to the previous positions where they abut against each other.

Specifically, the cam mechanism may have a cam member disposed at a predetermined position in the tubular body and a cam raceway formed on the rotary valve member. The cam raceway is designed to slidingly engage the cam member in response to the movement of the valve holder between the closed position and the open position, thereby causing the rotary valve member to rotate between the closed rotational position and the open rotational position.

More specifically, the cam member may be a pin set across the through-hole of the tubular body and having both ends thereof supported by the tubular body, and the cam raceway may be a cam slot formed in the rotary valve member so as to receive the pin.

The rotary valve member may have a through-hole that communicates with the fluid path extending through the valve seat portion and the valve support portion when the rotary valve member is in the open rotational position.

In addition, the pipe coupling may be arranged as follows. The valve support portion has a tubular part that slides in the through-hole of the tubular body and a pair of support arms extending forward from the tubular part along both sides of the rotary valve member and abutting against the valve seat portion. The rotary valve member is rotatably supported by the support arms.

The valve seat may be formed by an annular resilient seal ring.

Advantageous Effects of the Invention

According to the present invention, even if the pressing force applied between the rotary valve member and the valve seat is sufficiently increased to ensure sealing therebetween, the rotary valve member can surely return to the closed rotational position when the coupled coupling members are decoupled from each other.

BRIEF DESCRIPTION OF THE DRAWINGS

[FIG. 2b] is a side view similar to FIG. 2a, in which all the constituent elements, including the valve units, are shown in sectional view.

BEST MODE FOR CARRYING OUT THE INVENTION

Figure 1A:
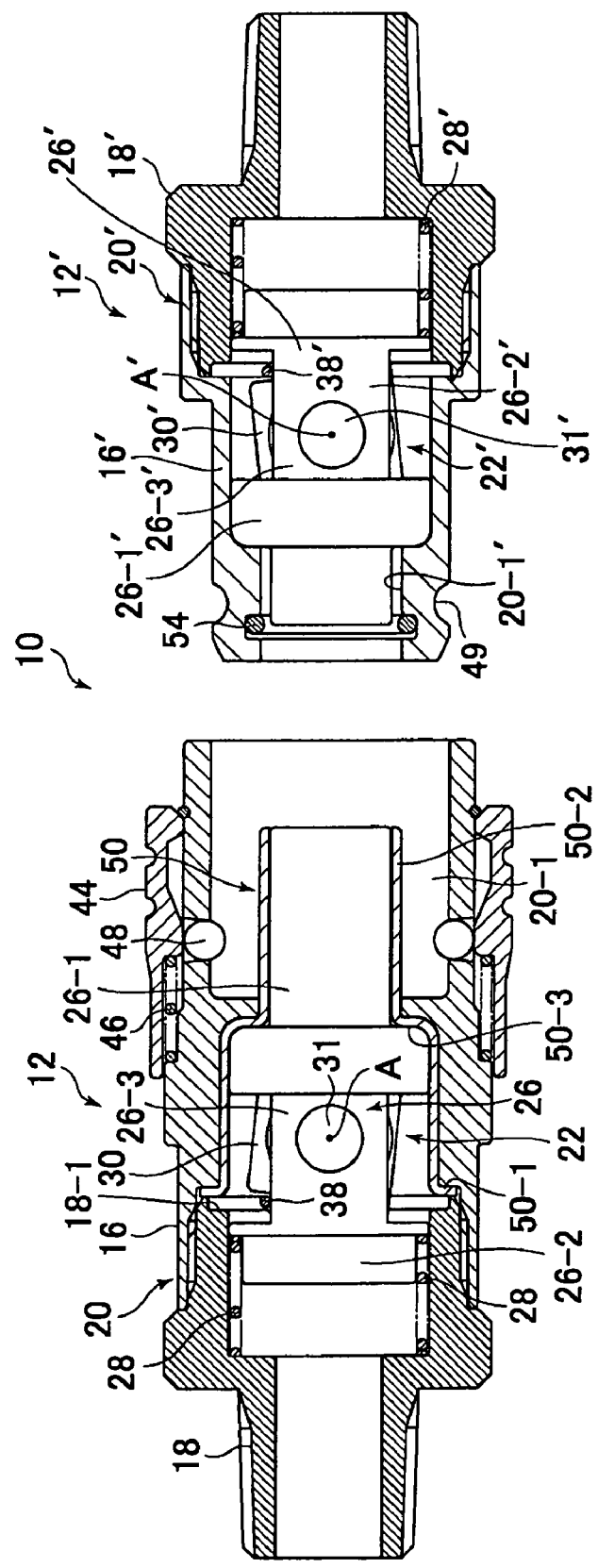
[FIG. 1a] is a side view of a pipe coupling according to the present invention, showing a state where a female coupling member and a male coupling member are not coupled to each other, in which constituent elements other than valve units are shown in sectional view.

A pipe coupling according to the present invention will be explained below with reference to the accompanying drawings.

The feature of the pipe coupling 10 according to the present invention resides in its valve units. A valve unit 22 of a female coupling member and a valve unit 22' of a male coupling member are substantially the same in basic structure. Therefore, the female coupling member 12 will be mainly explained below, and a description of the male coupling member 12' is omitted herein. Regarding the male coupling member 12', constituent elements equivalent to those of the female coupling member 12 are denoted by the same reference numerals as used for the female coupling member 12, but with an apostrophe (') added.

As shown in the figures, the female coupling member 12 has a tubular body 20 and a valve unit 22. The tubular body 20 comprises a tubular coupling body 16 and a tubular adapter 18 connected to the rear end of the coupling body 16 to couple a pipe to the female coupling member 12. The valve unit 22 is set in a through-hole 20-1 extending through the tubular body 20 so as to be movable in the axial direction of the through-hole 20-1. A metal seal is used to seal between the coupling body 16 and the adapter 18. In the illustrated example, a sleeve 50 is fitted in the through-hole of the coupling body 16, and a flange 50-1 provided at the rear end of the sleeve 50 is held and fixed between the coupling body 16 and the adapter 18. The valve unit 22 is slidable in the sleeve 50.

The valve unit 22 has a valve holder 26 movable in the above-described axial direction, a spring member 28 that presses the valve holder 26 toward the forward end of the tubular body 20, and a rotary valve member 30 supported by the valve holder 26 so as to be rotatable about a pivot axis A extending in a direction perpendicular to the axis of the tubular body 20.

The valve holder 26 comprises a tubular valve seat portion 26-1 and a tubular valve support portion 26-2. The valve seat portion 26-1 is slidable in the sleeve 50, and the valve support portion 26-2 is slidable in the adapter 18. The valve support portion 26-2 has support arms 26-3 extending in contact with two opposite side surfaces, respectively, of the rotary valve member 30 and abutting against the rear end surface of the valve seat portion 26-1. The rotary valve member 30 is supported rotatably about the above-described pivot axis A by pivots 31 provided between the two opposite side surfaces of the rotary valve member 30 and the support arms 26-3, respectively. More specifically, the valve seat portion 26-1 has on its rear end surface a tubular extending portion 26-6 extending rearward from the outer peripheral edge of the rear end surface. The extending portion 26-6 has a tapered inner peripheral surface sloping radially outward in a rearward direction. The support arms 26-3 have their respective distal end portions inserted into the extending portion 26-6. The distal end portions of the support arms 26-3 are provided with respective tapered surfaces 26-7 corresponding to the tapered surface of the extending portion 26-6. The rotary valve member 30 has, as shown in FIGS. 1*b* and 2*b*, a through-hole 30-1 extending in a direction perpendicular to the above-described pivot axis to serve as a fluid path. A seal ring 26-8 is provided on the outer peripheral surface of the valve seat portion 26-1. When the female coupling member 12 and the male coupling member 12' are not coupled to each other, the seal ring 26-8 is pressed against a radially extending inner surface 50-3 of the sleeve 50 by urging force of the spring member 28 to seal between the sleeve 50 and the valve seat portion 26-1.

A cam mechanism 32 (FIGS. 1*b* and 2*b*) is provided between the valve unit 22 and the tubular body 20, which causes the rotary valve member 30 to rotate about the pivot axis A when the valve holder 26 moves in the above-described axial direction. That is, the cam mechanism 32 comprises a cam slot 30-2 extending through the rotary valve member 30 in the above-described pivot axis direction and formed in accordance with a desired cam curve in a section perpendicular to the pivot axis. The cam mechanism 32 further comprises a rectilinear pin 38 extending through the cam slot 30-2 in the pivot axis direction.

The pin 38 has both ends thereof positioned in a gap between an annular peripheral surface 18-1, which defines the forward opening of the adapter 18, and the flange 50-1 at the rear end of the sleeve 50 and supported by the edges of the support arms 26-3 in such a manner that the pin 38 is displaceable to some extent. When the valve holder 26 is moved in the above-described axial direction, the rotary valve member 30 is moved in the axial direction together with the valve holder 26. At this time, the wall surface of the cam slot 30-2, which is provided in the rotary valve member 30, slides relative to the pin 38, and while doing so, the rotary valve member 30 rotates about the pivot axis A.

Figure 1B:
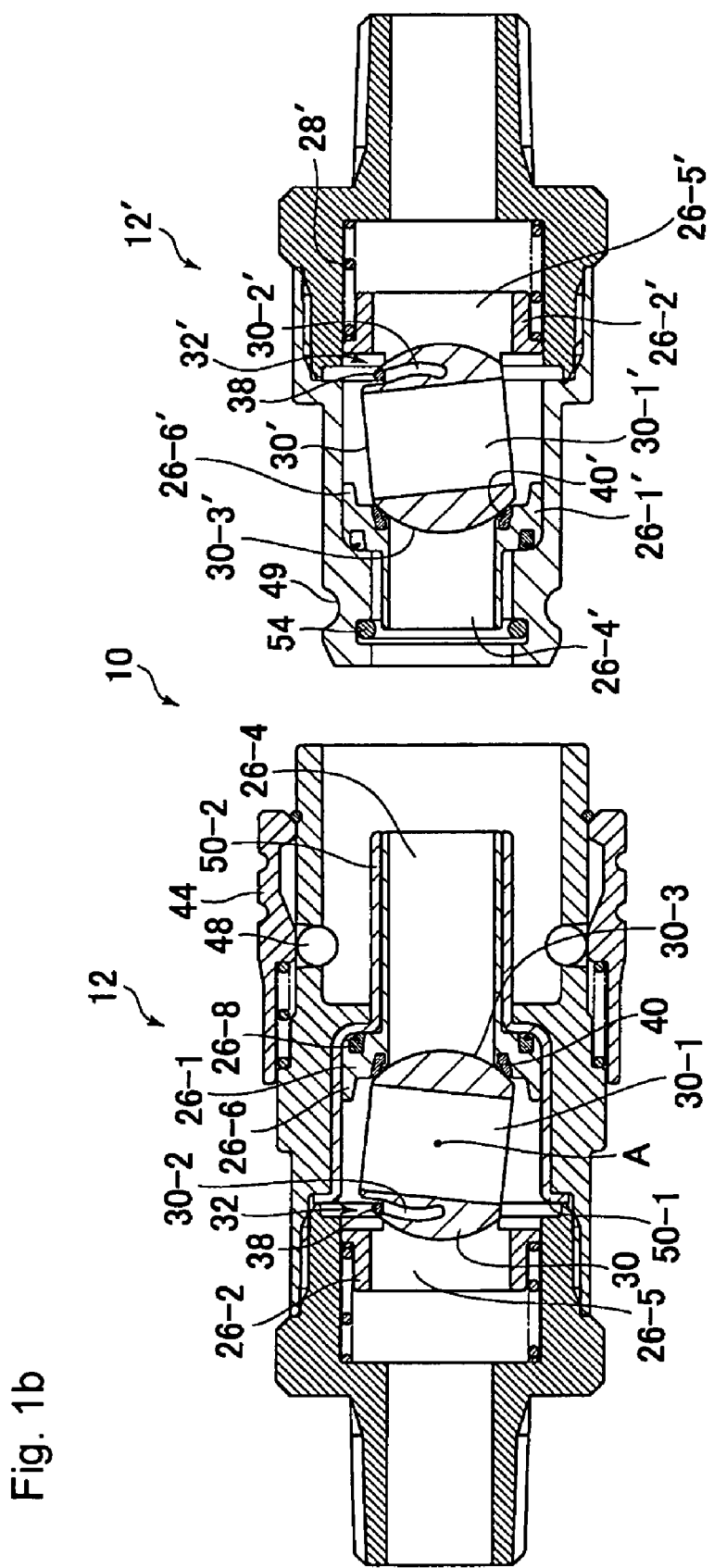
[FIG. 1b] is a side view of the pipe coupling, in which all the constituent elements, including the valve units, are shown in sectional view.
Figure 1C:
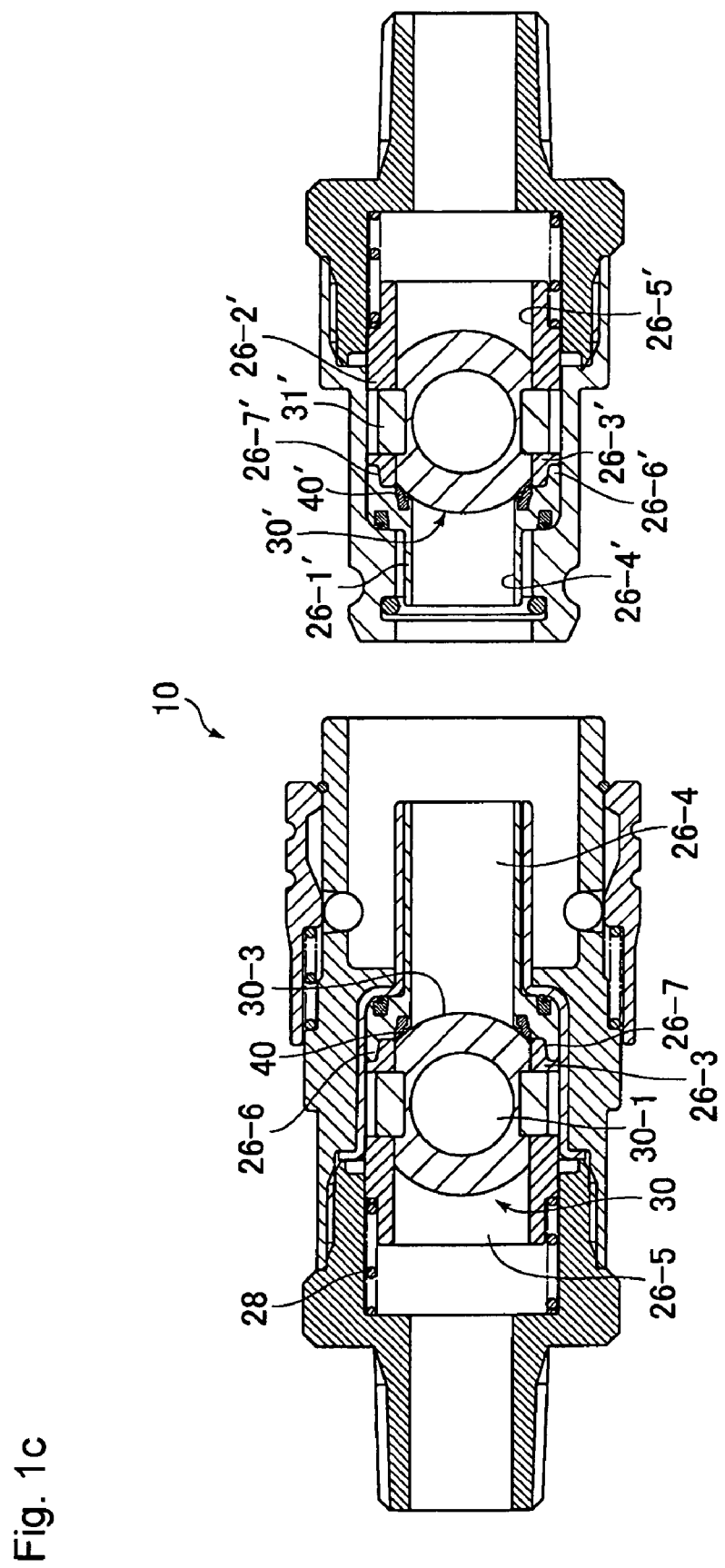
[FIG. 1c] is a plan view of the pipe coupling, in which all the constituent elements of the female and male coupling members are shown in sectional view.

As shown in FIGS. 1*a* to 1*c*, when the female coupling member 12 and the male coupling member 12' are separated from each other, i.e. in a decoupled state, the valve unit 22 is pushed out toward the forward end of the tubular body 20 by the spring member 28 to assume a closed position. In the closed position, the rotary valve member 30 is placed in a closed rotational position where the through-hole 30-1 of the rotary valve member 30 is not in alignment with fluid paths 26-4 and 26-5 in the valve seat and valve support portions 26-1 and 26-2 of the valve holder 26 and where a spherical seal surface 30-3 on the outer periphery of the rotary valve member 30 sealingly engages a valve seat formed by an annular resilient seal ring 40 provided around the fluid path 26-4 of the valve seat portion 26-1, thereby blocking the fluid from flowing through the valve unit 22.

Figure 2A:
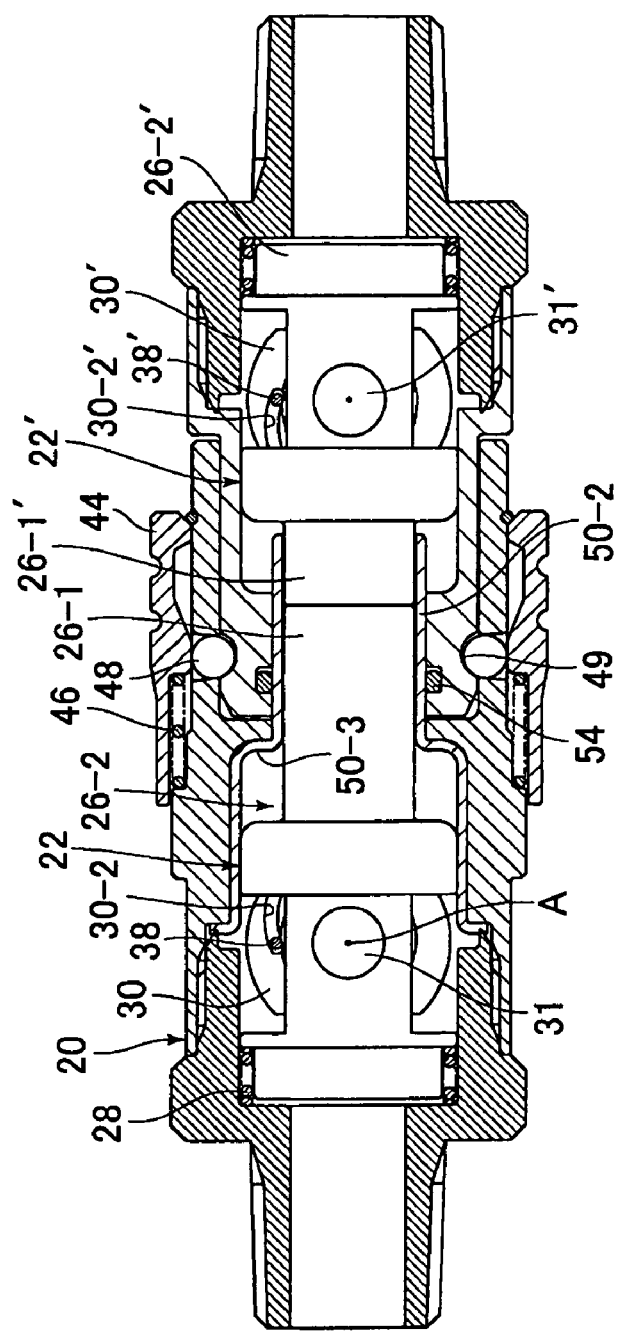
[FIG. 2a] is a side view of the pipe coupling according to the present invention, showing a state where the female coupling member and the male coupling member are coupled to each other, in which the constituent elements other than the valve units 22 are shown in sectional view.
Figure 2C:
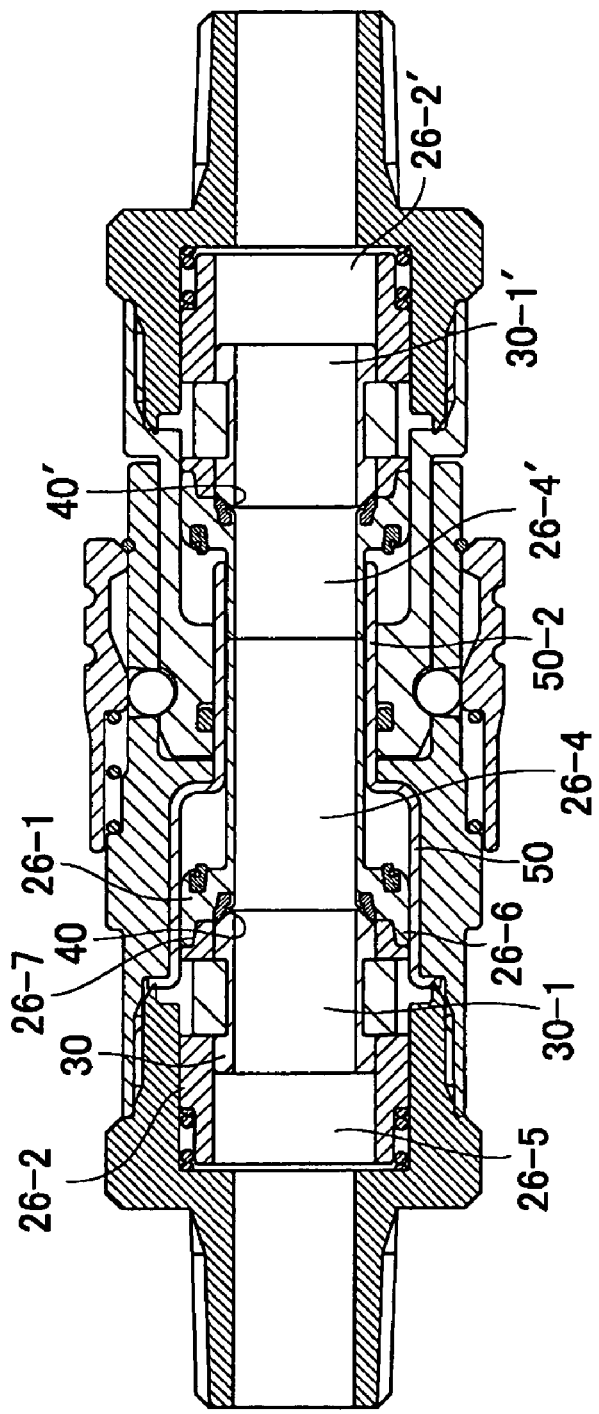
[FIG. 2c] is a plan view of the pipe coupling, in which all the constituent elements of the coupled female and male coupling members are shown in sectional view.

As shown in FIGS. 2*a* to 2*c*, when the female coupling member 12 and the male coupling member 12' are coupled to each other, the valve unit 22 is pushed into the tubular body 20 against the spring member 28 to assume an open position. In the open position, the rotary valve member 30 is placed in an open rotational position where the through-hole 30-1 of the rotary valve member 30 is in alignment with the fluid paths 26-4 and 26-5 in the valve seat and valve support portions 26-1 and 26-2 of the valve holder 26 to allow the fluid to flow through the valve unit 22.

More specifically, when the female coupling member 12 and the male coupling member 12' are to be coupled to each other, the distal end of the valve unit 22 (i.e. the distal end of the valve seat portion 26-1) is abutted against the distal end of the valve unit 22' of the male coupling member 12' and pushed in rearward, thereby being moved from the closed position to the open position. At this time, the wall surface of the cam slot 30-2 of the rotary valve member 30 slidingly engages the pin 38. Consequently, the rotary valve member 30 receives a clockwise turning moment of the reaction from the pin 38 and rotates from the closed rotational position (FIGS. 1*a* to 1*c*) to the open rotational position (FIGS. 2*a* to 2*c*). Conversely, when the female coupling member 12 and the male coupling member 12' are decoupled from each other, as the male coupling member 12' is separated from the female coupling member 12, the valve unit 22 of the female coupling member 12 is moved forward by the spring member 28 so as to follow the valve unit 22' of the male coupling member 12'. In this way, the valve unit 22 is moved from the open position (FIGS. 2*a* to 2*c*) to the closed position (FIGS. 1*a* to 1*c*). At this time, the cam slot 30-2 of the rotary valve member 30 slidingly engages the pin 38. Consequently, the rotary valve member 30 receives a counterclockwise turning moment of the reaction from the pin 38 and rotates from the open rotational position to the closed rotational position.

If the rotation of the rotary valve member 30 is stopped by frictional force occurring between itself and the annular seal ring 40 serving as a valve seat in the course of the male coupling member 12' being separated from the female coupling member 12, the forward movement of the valve support portion 26-2 is undesirably stopped. In such a case, however, if the male coupling member 12' continues to be separated from the female coupling member 12, there is no longer the pressing force from the spring member 28 that has so far been applied to the annular seal ring 40 of the valve seat portion 26-1 through the rotary valve member 30 between the valve seat portion 26-1' of the valve unit 22' of the male coupling member 12' and the valve support portion 26-2 of the valve unit 22. Accordingly, the frictional force between the rotary valve member 30 and the annular seal ring 40 reduces. Consequently, the rotary valve member 30 becomes free to rotate, and the valve support portion 26-2 is moved forward so as to follow the valve seat portion 26-1 by the urging force of the spring member 28. Thus, the rotary valve member 30 is rotated toward the closed rotational position by the cam mechanism 32. Accordingly, even if the pressing force applied to the rotary valve member 30 against the annular seal ring 40 (i.e. the urging force of the spring member 28) is sufficiently increased to ensure sealing therebetween, the rotary valve member 30 can surely return to the closed rotational position when the male coupling member and the female coupling member are decoupled from each other.

The valve unit 22' of the male coupling member 12' operates in the same way as the above-described valve unit 22.

It should be noted that an actuating sleeve 44 is provided on the outer periphery of the female coupling member 12. When the female coupling member 12 and the male coupling member 12' are to be coupled to each other, the actuating sleeve 44 is moved backward against a spring member 46 to allow locking balls 48 to be displaced radially outward. In this state, the forward end portion of the male coupling member 12' is inserted into the forward end portion of the female coupling member 12. Upon completion of the insertion of the male coupling member 12' into the female coupling member 12 as shown in FIGS. 2a to 2c, the actuating sleeve 44 is returned to the previous position to press the locking balls 48 into a locking recess 49 on the outer peripheral surface of the tubular body 20' of the male coupling member 12', thereby locking the male coupling member 12' in position. To decouple the female coupling member 12 and the male coupling member 12', the actuating sleeve 44 is moved backward against the spring member 46, and the male coupling member 12' is pulled out of the male coupling member 12'.

In this pipe coupling, when the female coupling member 12 and the male coupling member 12' are coupled together, leakage of fluid from the mutually abutting forward end surfaces of the valve units 22 and 22' to the outside through the area between the female coupling member 12 and the male coupling member 12' is blocked by an O-ring 54 that sealingly engages the outer peripheral surface of an extending portion 50-2 of the sleeve 50. The O-ring 54 is not in contact with either of the valve units 22 and 22', which are displaced in the axial direction. Therefore, the O-ring 54 will not interfere with the axial movement of the valve units 22 and 22'. Accordingly, there is no fluid leakage due to failure of the movement of the valve units 22 and 22' caused by the O-ring 54 when the female coupling member 12 and the male coupling member 12' are coupled together or decoupled from each other.

The invention claimed is:

1. A pipe coupling comprising a female coupling member and a male coupling member that are coupled to each other, wherein at least one of the female coupling member and the male coupling member includes:
    a tubular body having a through-hole extending from a forward end opening thereof through which the other of the female coupling member and the male coupling member is inserted;
    a valve unit set in the through-hole so as to be slidable in a direction of an axis of the through-hole, the valve unit having a valve holder that has a fluid path extending therethrough in the direction of the axis and that is movable in the through-hole between an open position and a closed position closer to the forward end opening than the open position, the valve unit further having a rotary valve member supported by the valve holder so as to be rotatable about a pivot axis perpendicular to the axis of the through-hole, the rotary valve member being rotatable between an open rotational position where the rotary valve member allows a fluid to flow through the fluid path when the valve holder is in the open position, and a closed rotational position where the rotary valve member blocks the fluid from flowing through the fluid path when the valve holder is in the closed position;
    a cam mechanism set between the valve unit and the tubular body to cause the rotary valve member to rotate between the closed rotational position and the open rotational position when the valve holder moves between the closed position and the open position; and
    urging means that urges the valve holder from the open position toward the closed position;
    the valve holder having a tubular valve seat portion and a tubular valve support portion that are disposed in series in the axis of the through-hole so as to be displaceable relative to each other in the direction of the axis, the valve support portion supporting the rotary valve member rotatably about the pivot axis, the valve seat portion having an annular valve seat formed around the fluid path, the rotary valve member having a seal surface on a part of an outer peripheral surface thereof, the seal surface sliding relative to the valve seat when the rotary valve member is rotated between the closed rotational position and the open rotational position such that when the rotary valve member is in the closed rotational position, the seal surface sealingly engages all around the valve seat to close the fluid path, whereas when the rotary valve member is in the open rotational position, sealing engagement of the seal surface all around the valve seat is free to open the fluid path;
    the urging means applying an urging force to the valve support portion to urge the valve holder from the open position toward the closed position, the valve holder being displaced from the closed position toward the open position against the urging means when the valve seat portion is engaged by the other of the female coupling member and the male coupling member inserted into the through-hole from the forward end opening.

2. The pipe coupling of claim 1, wherein the valve support portion comprises a pair of support arms extending forward from a tubular portion thereof with two opposite side surfaces of the rotary valve member being in contact with the support arms, the support arms abutting against a rear end surface of the valve seat portion, and the rotary valve member is rotatably supported between the support arms.

3. The pipe coupling of claim 2, wherein the valve seat portion comprises on the rear end surface thereof a tubular extending portion extending rearward from an outer peripheral edge of the rear end surface, the extending portion having a tapered inner peripheral surface sloping radially outward in a rearward direction, the support arms having respective distal end portions inserted into the tubular extending portion, the distal end portions of the support arms being provided with respective tapered surfaces corresponding to the tapered inner peripheral surface of the tubular extending portion.

4. The pipe coupling of claim 1, wherein the cam mechanism comprises
    a cam member disposed at a predetermined position in the tubular body; and
    a cam raceway formed on the rotary valve member, the cam raceway being designed to slidingly engage the cam member in response to movement of the valve holder between the closed position and the open position, thereby causing the rotary valve member to rotate between the closed rotational position and the open rotational position.

5. The pipe coupling of claim 4, wherein the cam member is a pin set across the through-hole of the tubular body and having both ends thereof supported by the tubular body;

the cam raceway being a cam slot formed in the rotary valve member so as to receive the pin.

6. The pipe coupling of claim 1, wherein the rotary valve member has a through-hole that aligns with the fluid path extending through the valve seat portion and the valve support portion when the rotary valve member is in the open rotational position.

7. The pipe coupling of claim 1, wherein the valve seat comprises an annular resilient seal ring.

* * * * *